United States Patent Office 3,565,656
Patented Feb. 23, 1971

3,565,656
NOVEL ALUMINUM LAKE PIGMENTS OF IRON HYDROXIDES
Howard T. Allen and John F. Santimauro, Wyckoff, N.J., assignors to Allied Chemical Corporation, New York, N.Y., a corporation of New York
No Drawing. Filed Apr. 11, 1968, Ser. No. 720,476
Int. Cl. C09c 1/0, 1/22, 1/24
U.S. Cl. 106—304  3 Claims

ABSTRACT OF THE DISCLOSURE

Soft, easily dispersible iron oxide pigments are obtained by laking, i.e. precipitating, freshly prepared ferrous/ferric hydroxide together with aluminum hydroxide, filtering, washing the precipitate inorganic salt-free, and drying the product. When incorporated into synthetic resin systems, e.g. thermosetting acrylic resins, pigmented coating compositions of excellent fastness characteristics and transparency are obtained.

Iron oxide pigments varying in shade from yellow to red to black are well known and have been widely used as pigments for coating compositions such as paints, enamls, lacquers, etc., because of their low cost and excellent durability. Both the naturally occurring and synthetic iron oxide pigments are, however, subject to the same general deficiencies such as dullness of shade and opacity.

The more recent improvements in paint technology developed requirements for improved transparency in order that the novel color effects made possible by combination of transparent pigments with flaked metals in the formulation of automobile finishes can be obtained with the lower cost iron oxide pigments. Currently available iron oxide pigments have been of little use in such formulations due to their dullness and opaqueness and the many attempts which have been made to improve them in these respects have met with moderate success in the market place.

Freshly precipitated hydrous iron oxides exhibit a high degree of transparency. On being "flushed" into a coating composition vehicle, e.g. in accordance with the procedure of U.S. Pat. 2,335,760, a portion of this transparency is retained. However, the transfer of a highly hylrophilic pigment into a hydrophobic oil vehicle is difficult since the hydrated oxide, in paste form, tends to change in color as it ages, thereby making reproducible shades difficult to obtain. Furthermore, the degree of transparency obtained by this procedure, in general, leaves something to be desired.

It has also been suggested to carry out the "flushing" operation in the presence of relatively large amounts of an emulsifying agent. The presence of such agents in the final product may be undesirable. Moreover, the presence of the vehicle is often inconvenient since the formulator's control over the composition is limited as many common vehicles are incompatible with many resins.

It is thus a principal object of the present invention to provide highly transparent iron hydroxide pigments in dry easily dispersible form.

Another object is to provide hydrous iron oxide pigments in dry form which are eminently suitable for pigmentation of thermosetting acrylic resin based coating compositions.

Still another object is to devise a process for the preparation of aluminum hydroxide lakes of ferric/ferrous hydroxide.

Other objects of our invention will become more apparent from the following detailed description.

In accordance with the present invention, the above objects are accomplished by forming a neutral to slightly alkaline dispersion of ferric hydroxide admixed with from 0 to 90% of ferrous hydroxide and, following addition of aluminum sulfate or any other soluble aluminum sulfate or any other soluble aluminum salt, carefully alkalinizing the mixture to cause the mixture of hydroxides to precipitate. The precipitated hydroxides are separated from the mother liquor by conventional means, e.g. by filtration, centrifugation, decantation and the like, and the precipitate is washed with water to remove soluble salts. The washed cake is dried and the dried product is ground to a powder. The powder is a soft, readily dispersible yellow to black pigment.

The preparation of hydrated iron oxide from aqueous ferrous or ferric salt solutions is well known in the art. Conveniently, copperas, the commercially available ferrous sulfate heptahydrate, is used although other sources of iron salts can be used. Copperas, being relatively inexpensive and readily available, is preferred. Other ferrous or ferric salts employable herein include the nitrates, chlorides, bromides and acetates.

Soluble aluminum salts employable in preparation of the aluminum hydrate lake compositions of the present invention include the sulfate, chloride, bromide, fluoride, nitrate and acetate. Aluminum oxide itself, which is capable of being readily solubilized by treatment with mineral or organic acids, is also employable. All such sources of aluminum ions are included within the scope of the term "soluble aluminum salt."

As is generally known, the term "lake" has been loosely used in the pigment art. As used herein, the term "lake" is equivalent to "reduced toner" and is applied to the intimate mixture of aluminum hydroxide and hydrated iron oxides, as may be obtained in accordance with the above-described procedure.

The amount of aluminum hydroxide or aluminum hydrate ($Al(OH)_3$ or $Al_2O_3 \cdot 3H_2O$), and ferric/ferrous oxide pigment present in the novel aluminum hydrate lake compositions of the present invention can be varied over a broad range. Improved transparency and other desirable properties have been noted when the aluminum hydroxide lake contains at least about 20%, by weight, aluminum hydroxides or hydrates, and at least about 20%, by weight, iron oxides, based on the total weight of aluminum hydrate lake of iron oxide pigment. Preferred aluminum hydrate lake compositions contain about 30% to 70%, by weight, of iron oxides and from 70% to 30%, by weight, of aluminum hydroxide, since such lakes are convenient to prepare and handle and are characterized by excellent pigment properties such as dispersibility in coating vehicles and transparency of the finishes containing them.

The shade of the novel aluminum hydroxide lake varies with the relative amounts of ferrous oxide and ferric oxides present. Thus, a pure yellow pigment is obtained when the iron content is substantially all in the ferric state. Admixture of the ferric axide with ferrous oxide causes the original yellow shade to redden and ultimately to become black at the maximum ferrous oxide content, above specified. Thus, the present invention encompasses the provision of yellow to red to black pigments derived from the aluminum hydroxide lakes of hydrated ferrous/ferric oxides in which the relative amounts of ferrous oxide may vary from 0% to 90% by weight and wherein the ferric oxide may vary from 100% to 10%.

These iron oxide mixtures may be obtained in several ways. Most conveniently, the pigment is prepared by first oxidizing an acid solution of ferrous salt, e.g., ferrous sulfate, substantially completely to the ferric state, and then, prior to conversion of the ferric salt to ferric oxide, adding to the resultant solution an amount of soluble ferrous salt sufficient to provide the desired proportions of ferric oxide and ferrous oxide upon addition of alkali. Alternatively, the oxidation of the ferrous salt may be interrupted when the desired proportions of ferric and ferrous ions are present. Since this latter method is more difficult to control, and hence reproduce, it is the less preferred.

In accordance with a preferred mode of preparing the novel lakes of the present invention, a solution of copperas, or other soluble ferrous salt, e.g., from about 30 to 100 parts of $FeSO_4 \cdot 7H_2O$, in about 200 to 300 parts of warm (50° C.) water, about 5 to about 20 parts of a mineral acid such as sulfuric acid, i.e., sufficient acid to insure a solution pH of below about 6.5 and a suitable oxidizing agent, e.g., from about 2 to about 6 parts of sodium chlorate. The resultant solution is agitated at about 60° to 80° C. to complete the oxidation of substantially all of the ferrous ions to ferric ions and thereafter the mass is cooled to below 40° C., e.g., by the addition of cold water and/or ice. Additional ferrous salt may be added to provide the desired ferric to ferrous hydroxide ratio which determines the shade of the pigment obtained. This solution is run into about 2000 parts of a dilute aqueous alkaline hydroxide, e.g., sodium or potassium hydroxide, and the pH of the resultant slurry of ferrous/ferric hydroxide is adjusted to between about 6 and 8 with dilute aqueous mineral acid. After introduction of an aqueous solution of an aluminum salt, e.g., about 70 to 100 parts of aluminum sulfate dissolved in abot 300 parts of water, the mixture is made definitely alkaline by the addition of aqueous alkali, e.g., about 40–50 parts of sodium carbonate dissolved in about 300 parts of water. The aqueous slurry then is filtered, washed free of water soluble salts and dried. The resulting ferrous/ferric oxide-aluminum hydroxide lake is a soft, easily dispersible powder which when incorporated in various synthetic resin systems gives highly transparent yellow to black coatings.

The oxidation of the ferrous salt is preferably carried out to substantial completion and a predetermined quantity of ferrous salt added subsequent to the oxidation. This procedure permits the operator to more conveniently control the mixture of hydroxides, and hence, the shade of the ultimate pigment.

The novel yellow to red to black pigments of the present invention are capable of being incorporated in a broad range of natural and synthetic resins and formulated as coating compositions in accordance with the well-known techniques of this art. Thus, the aluminum lakes can be incorporated into coatings by means of conventional paint grinding equipment such as ball or pebble mills, roller mills, Werner and Pfliederer mixers, or sand mills. It has been discovered that the pigments of the present invention, comprising an aluminum hydroxide lake of an intimate mixture of ferric oxide and from 0% to 90% by weight of ferrous hydroxide intimately admixed therewith, are surprisingly stable in admixture with a broad range of resins, particularly thermosetting acrylic resins, and impart thereto pleasing shades of excellent fastness characteristics, i.e., fast to light and durable with respect to gloss and weathering. The pigmented resin composition and finishes of the present invention have excellent exterior durability, light fastness and gloss retention characteristics, and are of especially superior fastness to light.

The resin systems which can be pigmented with the compositions of the present invention include both thermoplastic and thermosetting resins, such as polyacrylonitrile, polyacrylic esters, nitrocellulose, ethyl cellulose, cellulose esters, alkyds, alkydureas, polyesters, epoxy systems, vinyl and styrene resin systems, silicone and modified silicone coating, phenolics, ester gums, and urethane resin systems. Such pigmented coating compositions can be applied to suitable substrates by any well known application method such as by spraying, dipping or brushing, roller coating, and the like.

The amount of iron-oxides/aluminum hydroxide lake pigment which can be used to color the resin coating compositions may vary over a broad range, and, in general, is dependent upon the depth of shade of coloration desired. Accordingly, this invention contemplates the addition of from extremely small amounts of colorant to obtain pastel shades or as tinting colors to relatively large amounts to obtain deep shades or as master pigment batches. Thus, light shades or tints can be obtained with an amount of aluminum lake containing as low as about 0.1% by weight of the coating composition. For deep shades, amounts of 25% by weight or more of the pigment based on the weight of the coating composition may be employed. When used as master pigment batches, coatings of any desirable depth of shade may be prepared by mixing the mill base with unpigmented resin and further processing the mixture. If desired, additional pigments, such as titanium dioxide, metallic aluminum powder, and the like may be added also, in an amount of from about 0.5% to 98% of the weight of the novel pigment.

The iron oxide lakes are of especial interest as pigments for the thermosetting acrylic resins which are currently being employed in substantial amounts for the preparation of automotive finishes. Such resins comprise polymeric derivatives of acrylic acid and methacrylic acid, their esters, amides, etc., containing one or more functional groups capable of leading to further reaction resulting in a polymer derived from acrylic monomers. This term, "thermosetting acrylic resin," is also used to include polymers derived from mixtures of acrylic monomers and other monomers such as styrene, acrylonitrile, vinyl toluene, maleic esters, and the like. This term is used herein in a broad rather than a narrow sense. The preparation of thermosetting acrylic resins is well known and has been described in numerous articles such as "Thermosetting Acrylics" by Thomas J. Miranda in the Journal of Paint Technology, vol. 38, N. 499, August 1966, pages 469–477 and "Thermosetting Acrylic Resins," by K. E. Piggott in The Journal of Oil and Colour Chemists Association, December 1963, pages 1009–1026, the disclosures of which are incorporated herein by reference. Hydroxyl type acrylic resins, i.e., resins which employ a hydroxyl group as a functional group in the cross-linking step of their preparation are frequently used in the preparation of automotive and appliance enamels since they can be cured at low temperatures with melamine resins. The particular coatings obtained using these resins are characterized by high spray solids, good hardness, flexibility and appearance after spraying and baking.

The present invention may be illustrated by the following specific examples, but it is to be understood that the invention is not to be limited to the details thereof. Parts and percentages are by weight and temperatures are in degrees centigrade, unless otherwise specified.

EXAMPLE 1

A mixture of 86.5 parts of copperas (technical grade ferrous sulfate heptahydrate), 16.5 parts of 66° Be. sulfuric acid and 250 parts of water was warmed to 50°, and 5.56 parts of sodium chlorate were added. The mass was agitated at 65° to 70° to complete the oxidation of the ferrous ions to ferric ions. After cooling to 30° by the addition of 180 parts of ice and water, the mass was drowned in 2000 parts of water at 30° containing 80 parts of 50% aqueous caustic soda. The pH of the slurry of ferric hydroxide was adjusted to between 6.5 and 7.5 by the addition of aqueous sulfuric acid, and to it was added an aqueous solution of 90 parts of aluminum sulfate $(Al_2(SO_4)_3 \cdot 18H_2O)$ in 300 parts of water. To this mixture a solution of 45 parts of sodium carbonate in 300 parts of water was added. The mixture was agitated for about 5 minutes, filtered, the filter cake washed well with water, and then dried. The dried product, ferric hydroxide/aluminum hydroxide gold powder, weighed 60.5 parts.

EXAMPLE 2

A mixture of 69.2 parts of copperas, 13.2 parts of 66° Be. sulfuric acid and 250 parts of water was warmed to 50° and to it were added 4.45 parts of sodium chlorate. After being agitated at 65° to 70° to complete the oxidation, the mass was cooled to 30° by dilution with 180 parts of ice and water. Following the addition of 17.3 parts of copperas, the mass was run into 2000 parts of water at 30° C. containing 74.8 parts of 50% aqueous caustic soda. The mass was agitated to complete the precipitation of a mixture of ferrous and ferric hydroxides, after which the pH of the slurry was adjusted to between 6.5 and 7.5 with dilute sulfuric acid. A solution of 90 parts of aluminum sulfate in 300 parts of water was added followed by the addition of 45 parts of sodium carbonate dissolved in 300 parts of water. The mixture was filtered, the filter cake washed well with water and then dried. The dried product, an aluminum hydroxide lake of ferric/ferrous hydroxides, containing about 80% ferric and 20% ferrous hydroxides and weighing 59.5 parts, was obtained.

EXAMPLE 3

To a solution, at 50°, of 34.6 parts of copperas, 6.6 parts of 66° Be. sulfuric acid, and 250 parts of water, 3.34 parts of sodium chlorate were added. The mixture was agitated at 65° to 70° to complete the oxidation, after which the mass was cooled to 30° by dilution with 180 parts of ice and water. Following the addition of 34.6 parts of copperas, the mixture was run into 2000 parts of water containing 69.6 parts of 50% aqueous caustic soda at 30°. The mixture was agitated to ensure complete precipitation of the iron hydroxides and the pH of the slurry was adjusted to between 6.5 and 7.5 with dilute sulfuric acid. Thereafter, a solution of 90 parts of aluminum sulfate in 300 parts of water was added, followed by the slow addition of 45 parts of sodium carbonate dissolved in 300 parts of water. The resultant slurry was filtered, the filter cake washed well with water, and dried. The product, weighing 58.5 parts, was the aluminum lake of a mixture of about 60% ferric and 40% ferrous hydroxides.

EXAMPLE 4

Copperas, 34.6 parts, dissolved in 250 parts of warm (50°) water, and 6.6 parts of 66° Be. sulfuric acid was oxidized to ferric sulfate with 2.22 parts of sodium chlorate at 65° to 70°. After cooling the mass to 30° by the addition of 180 parts of ice and water, 51.9 parts of copperas were added. The mass was run into a solution of 64.4 parts of 50% aqueous caustic soda and 2000 parts of water at 30°. When the precipitation of the mixture of ferric and ferrous hydroxides was completed, the pH of the slurry was adjusted to between 6.5 and 7.5 with dilute sulfuric acid. Then 90 parts of aluminum sulfate, dissolved in 300 parts of water, were added followed by the slow addition of 45 parts of sodium carbonate dissolved in 300 parts of water. The resultant slurry of pigment was filtered, the filter cake washed free of soluble salts with water and then dried. The dried pigment, weighing 57.5 parts, was an aluminum hydroxide lake of a mixture consisting of about 40% ferric hydroxide and about 60% ferrous hydroxide.

EXAMPLE 5

To a solution of 17.3 parts of copperas in 3.3 parts of sulfuric acid and 250 parts of water at 50°, 1.11 parts of sodium chlorate were added. The mass was agitated at 65° to 70° to complete the oxidation of ferrous sulfate to ferric sulfate. The mass was cooled to 30° with 180 parts of ice and water, and 69.2 parts of copperas were added. The mass was run into a solution of 59.2 parts of 50% aqueous caustic soda in 2000 parts of water. The pH of the resultant slurry of iron hydroxides was adjusted to between 6.5 and 7.5 with dilute sulfuric acid and 90 parts of aluminum sulfate dissolved in 300 parts of water were added. Thereafter, 45 parts of sodium carbonate, dissolved in 300 parts of water, were added slowly. The pigment slurry was filtered from the mixture, the filter cake was washed well with water, and finally dried. The pigment, weighing 56.6 parts, was the aluminum hydroxide lake of a 20% ferric/80% ferrous hydroxide mixture (approximate ratio).

A mixture of 30 parts of the ferric/ferrous hydroxide mixture (approximate ratio).

EXAMPLE 6

A mixture of 30 parts of the ferric/ferrous hydroxides-aluminum lake pigment preparted as described in Example 3 above, 40 parts of a commercially available thermosetting acrylic resin solution containing 50% non-volatiles and comprising styrene-modified copolymers of methacrylate and acrylate esters, containing free hydroxyl and carboxyl groups and 70 parts of xylene, was homogenized by passage through a sand mill. The paste was then thoroughly mixed with sufficient butylated amino formaldehyde condensate solution containing 60% non-volatiles ("melamine resin") to produce a coating composition having the following composition:

|  | Percent |
|---|---|
| Gold powder, pigment | .8 |
| Thermosetting acrylic vehicle (100% solids) | 24.5 |
| Melamine resin (100% solids) | 10.5 |
| Solvent | 57.0 |

The coating composition was used to coat primed steel panels in a conventional manner and following a brief air dry, cured by baking in a drying oven at 120° for 2 hours. The resultant finish had a deep rich golden mass tone and excellent transparency. The coating had excellent light fastness and gloss retention.

EXAMPLE 7

A mixture of 15 parts of the Gold Powder pigment prepared as described in Example 4 above, 10 parts of cellulose acetate butyrate resin and 90 parts of toluol was ground in a ball mill for 24 hours. The resultant mixture was reduced in a conventional manner to a finish having the following composition:

|  | Percent |
|---|---|
| Gold powder | 5 |
| Plasticizer (butylbenzylphthalate) | 9 |
| Cellulose acetate butyrate resin | 6 |
| Acrylic resin (100% solids) | 15 |
| Solvent blend (Solvent #10 of U.S. Pat. 2,934,510) | 65 |

About 0.5 part of aluminum flake was added to 100 parts of the above finish which then was applied over a bright highly reflectant metallic substrate. The resultant "acrylic lacquer" coating produced a rich gold metallic finish with a high gloss possessing excellent gloss retention and excellent light fastness upon exposure to the elements. This polychromatic metallic finish possessed the desirable "flop" characteristic also.

It can thus be seen that novel aluminum hydroxide lakes of hydrated iron oxides have been provided and that such lakes are readily obtained and remarkably useful as pigments for a variety of resin based compositions, especially thermosetting and thermoplastic acrylic resins. As indicated in the above examples, these lakes when incorporated in acrylic resin compositions, possess excellent transparency and light fastness, as well as other desirable characteristics.

We claim:

1. A pigment lake composition comprising an intimate mixture of aluminum hydroxide and hydrated iron oxides comprised of (a) ferric hydroxide and (b) from 0% to 90%, by weight, of ferrous hydroxide, based on total weight of hydrated iron oxides present, said aluminum hydroxide and hydrated iron oxides each being present in an amount of at least about 20% by weight, based on the total weight of aluminum hydroxide-hydrated iron oxide mixture.

2. The pigment composition as defined in claim 1 wherein said pigment lake composition contains from about 30% to 70%, by weight, of iron oxides and from 70% to 30%, by weight of aluminum hydroxide.

3. A process for the preparation of a pigment lake composition as defined in claim 1 which comprises adding a soluble aluminum salt to a dispersion of ferric hydroxide admixed with 0% to 90% of ferrous hydroxide, adding an alkaline agent to the resulting mixture of iron hydroxides and soluble aluminum salt in an amount sufficient to render said mixture alkaline, and recovering precipitated metal hydroxides from the solution.

References Cited

UNITED STATES PATENTS

| | | | |
|---|---|---|---|
| 2,090,476 | 8/1937 | Fireman | 106—304X |
| 2,335,760 | 11/1943 | Hucks | 106—304X |
| 2,618,571 | 11/1952 | Peel et al. | 106—304 |

FOREIGN PATENTS

| | | | |
|---|---|---|---|
| 26,278 | 12/1963 | Japan | 106—304 |

TOBIAS E. LEVOW, Primary Examiner

H. M. S. SNEED, Assistant Examiner

U.S. Cl. X.R.

106—288, 300; 117—132; 260—31